United States Patent
Dirksen et al.

(10) Patent No.: US 11,962,477 B1
(45) Date of Patent: Apr. 16, 2024

(54) HUMAN-AUTOMATION INTEROPERABILITY: INCIDENT REPORTING TOOL

(71) Applicant: T-Mobile Innovations LLC, Overland Park, KS (US)

(72) Inventors: Jamir A. Dirksen, Casselberry, FL (US); Dat Ho, Orlando, FL (US); Matthew D. Kurtz, Apopka, FL (US); Shane A. Lobo, Ponte Vedra, FL (US); Chris Poirier, Titusville, FL (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 18/319,455

(22) Filed: May 17, 2023

(51) Int. Cl.
*G06F 15/173* (2006.01)
*H04L 41/22* (2022.01)
*H04L 41/50* (2022.01)

(52) U.S. Cl.
CPC .......... *H04L 41/22* (2013.01); *H04L 41/5032* (2013.01)

(58) Field of Classification Search
CPC .............................. H04L 41/22; H04L 41/5032
See application file for complete search history.

(56) References Cited

U.S. PATENT DOCUMENTS

| | | | |
|---|---|---|---|
| 11,388,068 B1 * | 7/2022 | Balmakhtar | H04L 67/146 |
| 2010/0138750 A1 * | 6/2010 | Trinler | H04L 41/12 |
| | | | 715/736 |
| 2015/0254969 A1 * | 9/2015 | Bishop | H04L 41/0618 |
| | | | 340/506 |
| 2019/0116504 A1 * | 4/2019 | Rusackas | H04L 41/22 |
| 2021/0089370 A1 * | 3/2021 | Dukhovny | G06F 11/301 |
| 2021/0273843 A1 * | 9/2021 | Selokar | H04L 41/16 |
| 2022/0070050 A1 * | 3/2022 | D'Ippolito | H04L 41/0627 |
| 2023/0011522 A1 * | 1/2023 | Cohen | G06F 16/904 |
| 2023/0020832 A1 * | 1/2023 | Hotchkiss | H04L 41/12 |

* cited by examiner

*Primary Examiner* — Padma Mundur

(57) ABSTRACT

A method implemented by an incident reporting tool, comprising receiving, from an incident report database, an incident report associated with an incident; presenting, on a network operations center (NOC) dashboard, a status checklist allowing a NOC personnel to view status of one or more tasks associated with the incident report before the incident report autocloses, wherein the one or more tasks comprises one or more completed tasks and one or more uncompleted tasks based on the status; enabling the NOC personnel to take actions on the one or more uncompleted tasks to resolve the incident report; and dynamically updating the status checklist to view an updated status of the one or more tasks based on the actions taken by the NOC personnel.

20 Claims, 7 Drawing Sheets

300

All requirements must pass for the incident to be automatically closed.

Incident Type
Incident type is Independent.

Incident Reason
Incident reason is

Disaster Recovery
The following technologies on this site are down according to DR: 5G, LTE, GSM

Action Items
There are 0 open action items.

No reason provided.

HUMAN-AUTOMATION INTEROPERABILITY: INCIDENT REPORTING TOOL

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A network operations center (NOC) is a centralized monitoring and control station where NOC personnel monitor and maintain an organization's network infrastructure. In a network, incidents can cause interruption to the network operations. The automated alarms handling tools commonly action and close generated incident reports associated with the incidents. However, different types of incidents have different criteria for automatic closing, the NOC personnel face challenges in parsing through the incident reports which are not automatically closing.

SUMMARY

In an embodiment, a system is disclosed. The system comprises an incident report database comprising records of a plurality of incident reports, a NOC dashboard configured to present the incident reports; and an incident reporting tool coupled to the incident report database and the NOC dashboard, and configured to receive, from the incident report database, an incident report associated with the incident; present, on the NOC dashboard, a status checklist allowing a NOC personnel to view status of one or more tasks associated with the incident report before the incident report autocloses, wherein the status of one or more tasks comprising indicators indicating whether the incident is a chronic incident, indicating whether the incident is recent reset incident, and indicating whether the incident is a self-clear incident, and information related to an incident type, an incident status, an incident assignee, status of technologies on a cell site, and status of open action items, and wherein the one or more tasks comprises one or more completed tasks and one or more uncompleted tasks based on the indicators and information; enable the NOC personnel to take actions on the one or more uncompleted tasks to resolve the incident report; and update the status checklist to view an updated status of the one or more tasks based on the actions taken by the NOC personnel.

In another embodiment, a method implemented by an incident reporting tool is disclosed. The method comprises receiving, from an incident report database, an incident report associated with an incident occurring within a network having a plurality of network elements, wherein the incident report is generated based on alarm configuration information; presenting, on a network operations center (NOC) dashboard, a status checklist allowing a NOC personnel to view status of one or more tasks associated with the incident report before the incident report autocloses, wherein the status of one or more tasks comprises indicators indicating whether the incident is a chronic incident, indicating whether the incident is recent reset incident, and/or indicating whether the incident is a self-clear incident, and information related to an incident type, an incident status, an incident assignee, status of technologies on a cell site, status of open action items, and wherein the one or more tasks comprises one or more completed tasks and one or more uncompleted tasks based on the indicators and information; enabling the NOC personnel to take actions on the one or more uncompleted tasks to resolve the incident report; and dynamically updating the status checklist to view an updated status of the one or more tasks based on the actions taken by the NOC personnel.

In yet another embodiment, non-transitory computer-readable media of an incident reporting tool storing computer-executable instructions that upon execution cause one or more processors to perform acts comprising receiving, from an incident report database, an incident report associated with an incident occurring within a network having a plurality of network elements, wherein the incident report is generated based on alarm configuration information; presenting, on the NOC dashboard, a status checklist allowing a NOC personnel to view status of one or more tasks associated with the incident report before the incident report autocloses, wherein the status of one or more tasks comprises indicators indicating whether the incident is a chronic incident, indicating whether the incident is recent reset incident, and/or indicating whether the incident is a self-clear incident, and information related to an incident type, an incident status, an incident assignee, status of technologies on a cell site, status of open action items, and wherein the one or more tasks comprises one or more completed tasks and one or more uncompleted tasks based on the indicators and information; enabling the NOC personnel to take actions on the one or more uncompleted tasks to resolve the incident report; and dynamically updating the status checklist to view an updated status of the one or more tasks based on the actions taken by the NOC personnel.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
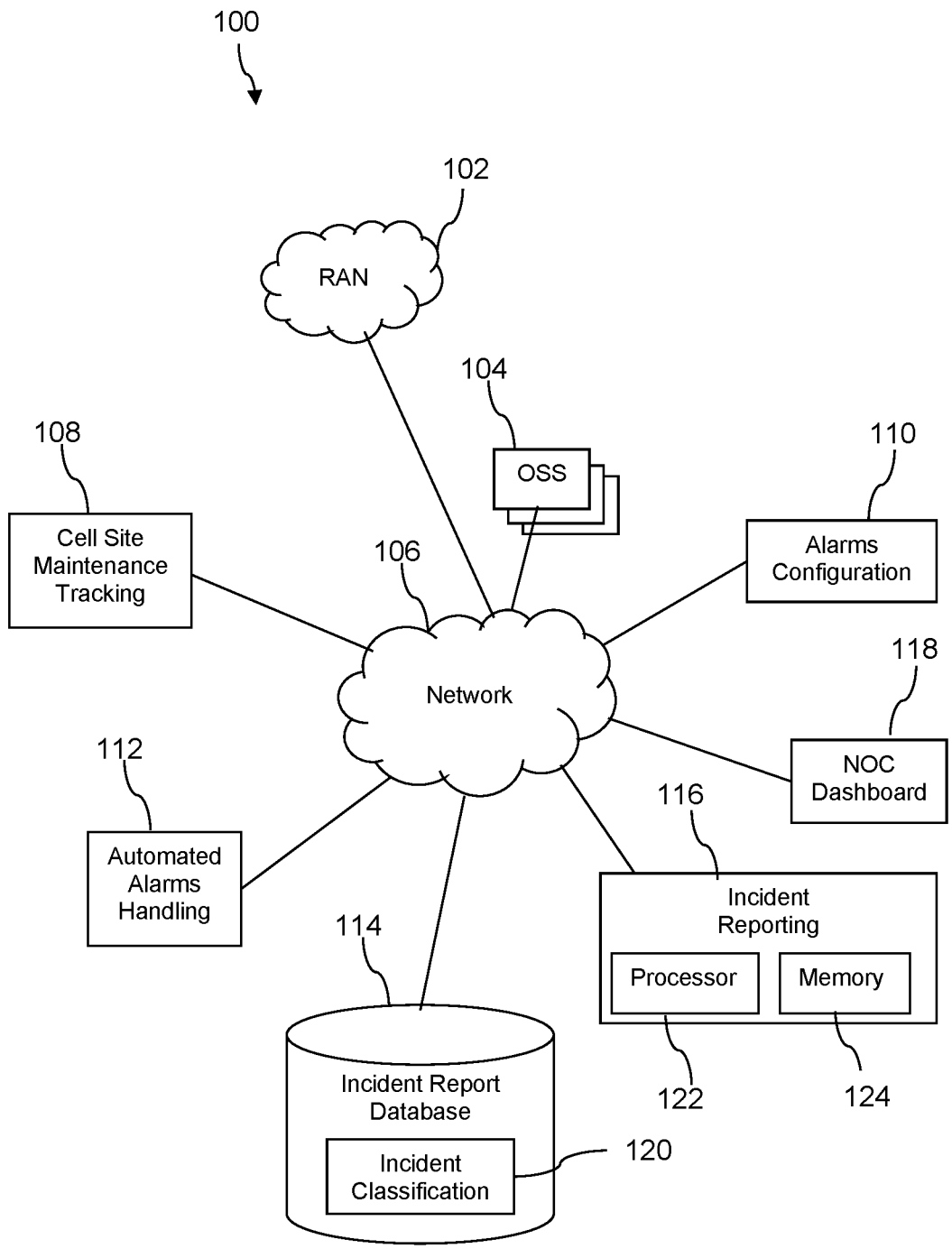
FIG. 1 is an illustration of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A network operations center (NOC) is a centralized monitoring and control station where NOC personnel monitor and maintain an organization's network infrastructure. Network monitoring involves receiving and understanding alarms that are assigned to various network elements. These alarms are activated when irregularities or fault events are detected in their respective elements. The alarms configuration platform may collect alarms generated by the network elements in the network and generate incident reports (a.k.a tickets or trouble tickets) associated with the events/incidents. Automated alarms handling systems may automatically initiate action to resolve the incidents and close the incident reports. However, different types of incidents have different criteria for automatic closing, the NOC personnel face challenges in parsing through the incident reports which are not automatically closing. This hampers the process of restoring the network.

Furthermore, NOC personnel receives multiple alarms per day resulting from enhancements in capacity requirements, exchange of vendors, changes in technologies or processes, frequent introduction of new technologies, closures of legacy technologies, compression of existing network, or operational issues which make it difficult to operate a network which is continuously changing. Furthermore, problem solving and maintaining a telecommunications network is dependent on the knowledge and experience of the people monitoring the alarms. Dependency on one or more particular persons becomes a problem when one or all of the people were to quit their job and when a new or less experienced specialist is charged with resolving the problems associated with the alarms.

Furthermore, it may be difficult and time-consuming for the NOC personnel to resolve related/nested alarms that are associated with each other. There are complexities that cause part of an alarm to autoclose but other part to hang open. In some cases, these nested alarms emerge from nested systems, where a problem in one system can echo in others and resolving one of them may not solve the root problem or solution of the root problem, may not automatically propagate to solve and close some of the related alarms and issues it may have caused. In such a scenario, ultimate problem resolution can be prolonged because troubleshooting subordinate-alarm system will yield results associated with the system working properly and resources can be wasted while attempting to resolve a child alarm that stems from a parent cause, wherein resolution of the parent cause would eliminate the child alarm. Furthermore, some incidents are chronic incidents that may have history of repeat and it is undesirable to close these as soon as all alarms clear. Some incidents are self-clears incidents such as power related incidents, transport, or environmental incidents. Some incidents are automated reset incidents which can be detected and executed fast. Thus, it is desirable to have a tool to provide a unified view to all teams at NOC center that can be employed for 1) checking recent resets and analyzing the resets, (2) checking and automatically resolving self-clear incidents, (3) delaying a pre-defined period of time to avoid the likelihood of a chronically recurring incident, 4) resolving nested alarms, 5) identifying trends of new issues, 6) parsing through the incident reports which are not automatically closing, or a combination thereof.

The present disclosure provides a single, unified view of details about active incidents including their status and indicators across different teams in the NOC via NOC dashboards to process alarm and incident information in a quick and efficient way. The present disclosure provides an incident reporting tool of a telecommunication network management system that enables reporting and displaying a status of an incident report associated with an incident to NOC personnel to identify and resolve the requirements of the incident report to be automatically closed. The incident reporting tool may assist the NOC personnel in learning the current state of the incident and parsing the notes on the incident report in order to determine the details of the alarms.

The incident reporting tool may import the incident reports from the incident report database and display a status checklist that lists all the tasks or events associated with the incident on a graphical user interface (GUI) commonly known as NOC dashboard. The NOC personnel manually interact with the NOC dashboard to monitor and parse the notes on the tasks or the incident script in order to determine the details of the tasks. The NOC personnel may identify open tasks which are critical to close a given incident report and determine action(s) taken to solve the issue. Automated alarms handling system may automatically close the incident report after completion of the open tasks.

For example, a cell tower may be experiencing a network outage. The network management system would trigger an alarm associated with the cell tower. The triggered alarm may be notified to generate an incident report. The automated alarms handling system may recognize the incident and perform automatic actions on the incident report including auto-closure. In a case, when the incident report does not close automatically, the disclosed incident reporting tool may report and display the incident report comprising a status checklist that lists all the tasks or events associated with the incident report for the NOC personnel to view the incident report. This allows NOC personnel to drill down into incident report and alarm notification, to visualize what has been completed and what remains to be completed before the incident autocloses, and to expedite the process of resolving the issue.

In an embodiment, the incident reports may be stored in an incident report database and classified based on the incident. The incident classification tool may classify the incident reports based on the incident type. The incident report comprises a status checklist indicating one or more completed tasks and one or more uncompleted tasks associated with the incident type. The status checklist may also provide a description of each task. The status checklist may comprise status of one or more tasks comprising indicators indicating whether the incident is a chronic incident, indicating whether the incident is recent reset incident, and indicating whether the incident is a self-clear incident, and information related to an incident type, an incident status, an incident assignee, status of technologies on a cell site, status of open action items, a cause of the incident, a status of an incident assignee group, a status of alarm associated to the incident, a status of the one or more completed tasks and the one or more uncompleted tasks, and a status of a technology associated with the incident. The one or more completed tasks may be marked in the GUI by an indicator (e.g., a check mark) indicating the completion of the task and the one or more uncompleted tasks may be marked in the GUI by another indicator (e.g., a cross mark) indicating open tasks. The NOC personnel, based on these indicators in the GUI, identify and take actions on the open tasks to resolve the incident. Once the NOC personnel resolve the open tasks and all the requirements, the automated alarm handling tool may automatically close the incident report.

The disclosed systems and methods disclosed herein can thus provide an improved approach by utilizing a unified and interactive GUI that can provide a visual display to assist an operator to identify related alarms and services and resolve the requirements of the incident report to be automatically closed. In this way, the present disclosure provides real time (or even constantly displayed and updated) lists of open problems that require immediate attention and help NOC personnel to take the right action to resolve the issues at an appropriate time. Furthermore, the present disclosure provides automated functions for correlating related alarms in order to group or aggregate the correlated alarms into an incident report and classifying the plurality of incident reports based on an incident type for NOC personnel to prioritize and manage the incident report more easily.

In an embodiment, the incident reporting tool further periodically checks the incident report database for all the active incident reports and refreshes the status of all the related tasks/events for each incident report. For example, the incident reporting tool may check the incident report database every ten seconds, every twenty seconds, or at some other periodic time interval. This tool provides insights to the NOC personnel on status of incident reports and can help quickly repair potential network failures and other issues. In an embodiment, the tool further monitors for chronic issues that may have occurred several times in the past to notify the network management system.

The disclosed systems and methods disclosed herein can thus provide NOC personnel a clear view of the overall status of the incident reports as well as details of open incident reports that require their attention. This provides a great way to surface more actionable insights to further assist with root cause analysis and help NOC personnel to take the right action quickly to resolve the issues.

Turning now to FIG. 1, a communication system 100 is described. In an embodiment, the communication system 100 comprises a radio access network (RAN) 102, an operation support system (OSS) 104, a network 106, a cell site maintenance tracking tool 108, an alarm configuration tool 110, an automated alarm handling tool 112, an incident report database 114, an incident reporting tool 116, and a NOC dashboard 118.

The RAN 102 includes a plurality of cell sites and network elements (NEs) associated with the RAN. The alarms may have been generated by various NEs of a service provider network. The NE, for example, may be any of a router, a digital switch, a media gateway, a mobile switching center (MSC), a visitor location register (VLR), a mobile management entity (MME), a serving gateway (SGW), a packet data network gateway (PDN-GW), a radius server, an authentication-authorization-and-accounting (AAA) server, a base transceiver station (BTS) or an enhanced Node B (eNB), a short message service (SMS) messaging component, a core network component, a wireless radio access network component, a voicemail component, or some other type of network element. The eNB may alternatively be referred to in some contexts as a base transceiver station or a cell tower. The service provider network is a portion of the network 106. The network 106 comprises one or more public networks, one or more private networks, or a combination thereof.

The RAN 102 provides access and coordinates the management of resources across the cell sites. Vendors of NEs and cell site equipment provide the OSS 104 for monitoring and remotely managing the NEs and cell site equipment. The OSS 104 support management functions such as network inventory, service provisioning, network configuration, and fault management. When the NEs or cell sites of the RAN 102 generate alarms, alarm notification flow down to the OSSs 104.

The cell site maintenance tracking tool 108 manages cell site maintenance and alarm suppression used by field operations personnel to place the cells site and/or NEs into scheduled maintenance. In some cases, during scheduled maintenance, alarm notifications may be suppressed to avoid unnecessarily opening incident reports related to such alarms. In some cases, a maintenance action may extend beyond the scheduled maintenance window, pending alarms are no longer suppressed (because the scheduled maintenance window has closed), and incident reports may be generated based on the alarms.

The alarm configuration tool 110 stores the alarm configuration information associated with the generated alarms. The OSS 104 receives alarm notifications from NEs of the RAN 102 based on the alarm configuration information and flows the alarm notifications to the NOC dashboard 118 and the incident report database 114.

Incident reports are created manually by NOC personnel using NOC dashboard 118 and automatically by the automated alarm handling tool 112. The automated alarm handling tool 112 performs automatic actions on the generated incident reports including auto-triage, auto-closure, and/or auto-remediation. The auto-triage involves auto-enrichment (adding supplemental information related to the context of the alarm of the NE or cell site equipment), auto-dispatch of field operations personnel (only under certain conditions), and auto-testing. The automated alarm handling tool 112 inquires the cell site maintenance tracking tool 108 to check the type of alarm to understand how to handle the alarm. For example, the automated alarm handling tool 112 inquires the cell site maintenance tracking tool 108 to check whether the alarm notification was received subsequent to taking a cell site out of maintenance state (e.g., out of scheduled maintenance mode of operation) and hence may support the inference that the field operations personnel may create an issue while performing maintenance or that that field operations personnel failed to push the "reset" button to clear all alarms at the cell site.

The incident report database 114 stores a plurality of generated incident reports and an incident classification tool 120. The incident classification tool 120 classifies the plurality of incident reports that are stored in the incident report database 114 based on an incident type. For example, when the incident type is a multi-site outage occurred from a storm, the incident classification tool 120 will classify the incident as a storm recovery incident.

The incident reporting tool 116 may comprise a memory 124 to store instructions and a processor 122 coupled to the memory 124 and configured to import the incident report from the incident report database 114, generate the requirements or checklist for autoclosing the incident report, and report a status of the incident report to the NOC personnel to identify and resolve the requirements for the incident report to be automatically closed by the automated alarm handling tool 112. The incident reporting tool 116 provides a status checklist that lists all the tasks or events associated with the incident report via a graphical user interface (GUI) commonly known as NOC dashboard 118. The NOC dashboard 118 may be communicatively coupled to the network 106 via a wireless or wired communication link.

The NOC dashboard 118 is a user interface employed by the NOC personnel to monitor health of a carrier network (e.g., monitor the RAN 102 and at least portions of the network 106), to monitor alarms, to drill down to get more details on alarms, to review incident reports, and to take corrective actions to restore the network to normal operational status. The NOC dashboard 118 may interact with the incident report database 114, with the cell site maintenance tracking system 108, the OSS 104, the RAN 102, and other systems. The NOC personnel interact with the NOC dashboard 118 to drill down into incident reports and alarm notifications and identify open tasks which are critical to close a given incident report. The NOC personnel may take manual corrective actions to resolve the issue. The automated alarms handling tool 112 may automatically close the incident report after completing the open tasks in the process of resolving the issue. In an embodiment, the incident reporting tool 116 further periodically checks the incident report database 114 for all the active incident reports and refreshes the status of all the related tasks/events for each incident report. This incident reporting tool 116 provides insights to the NOC personnel on the status of incident reports and can help quickly repair potential network failures and other issues.

Figure 2A:
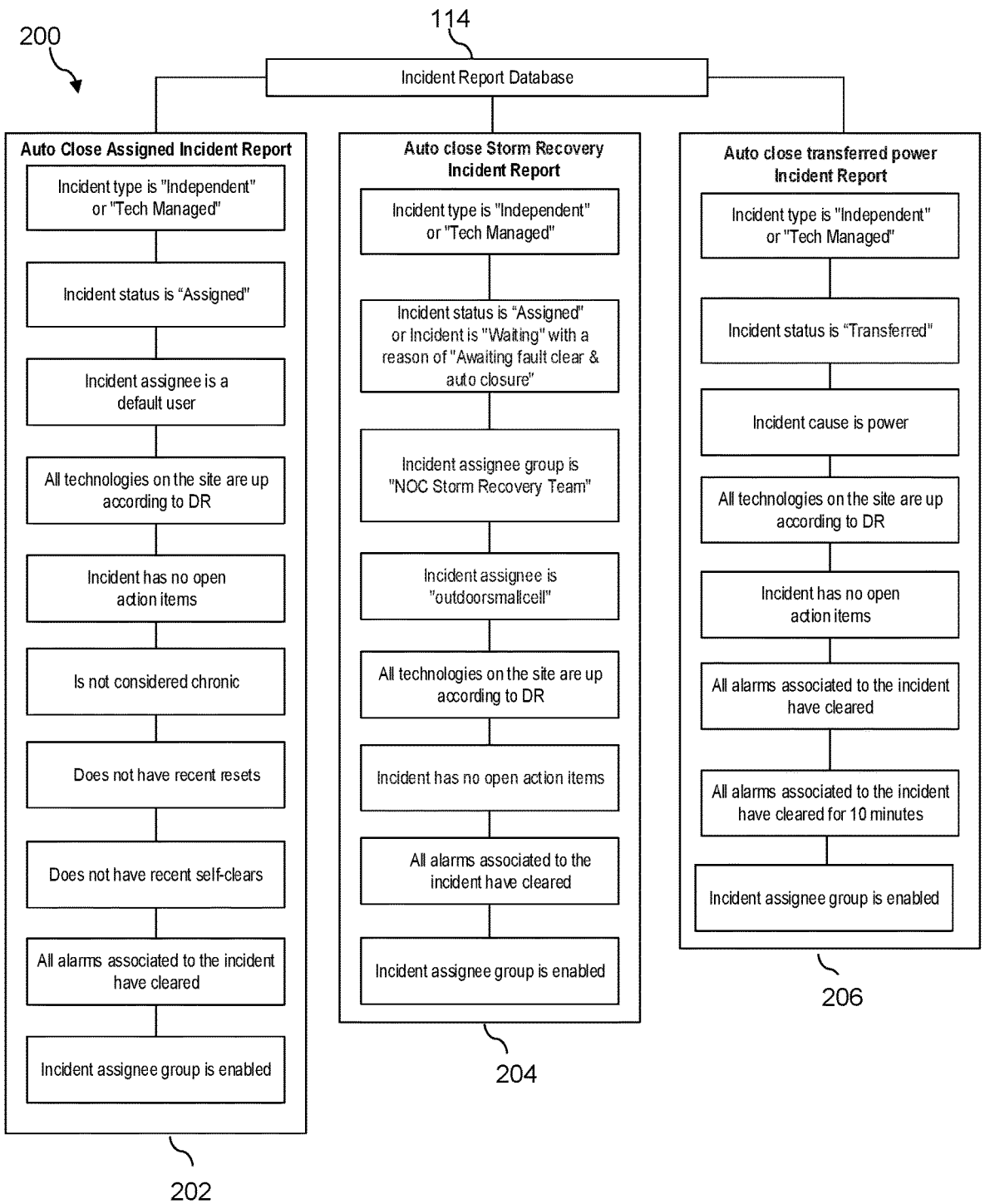
FIGS. 2A-2C are illustrations of checklist contents of incident reports according to an embodiment of the disclosure.
Figure 2B:
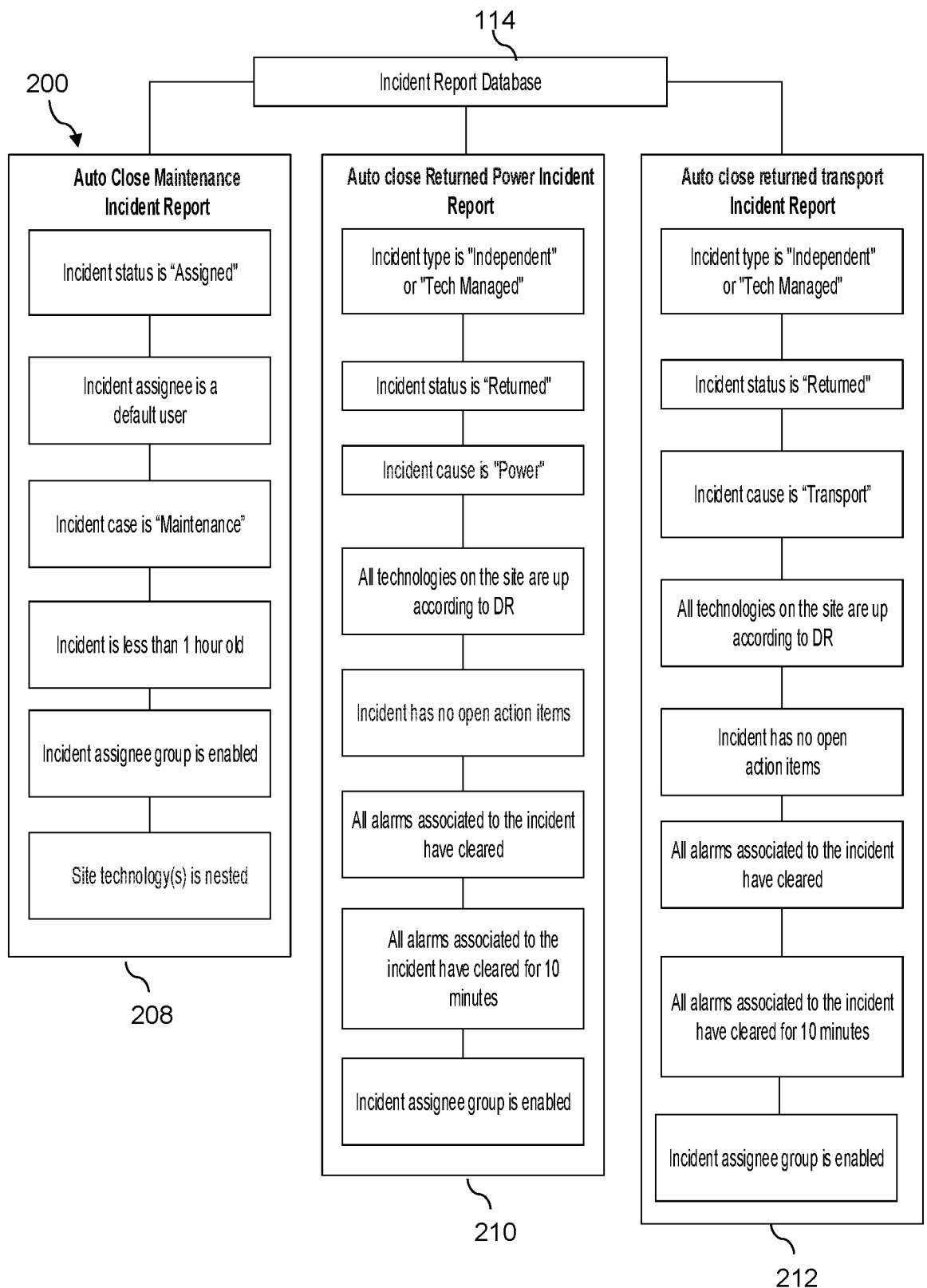
Figure 2C:
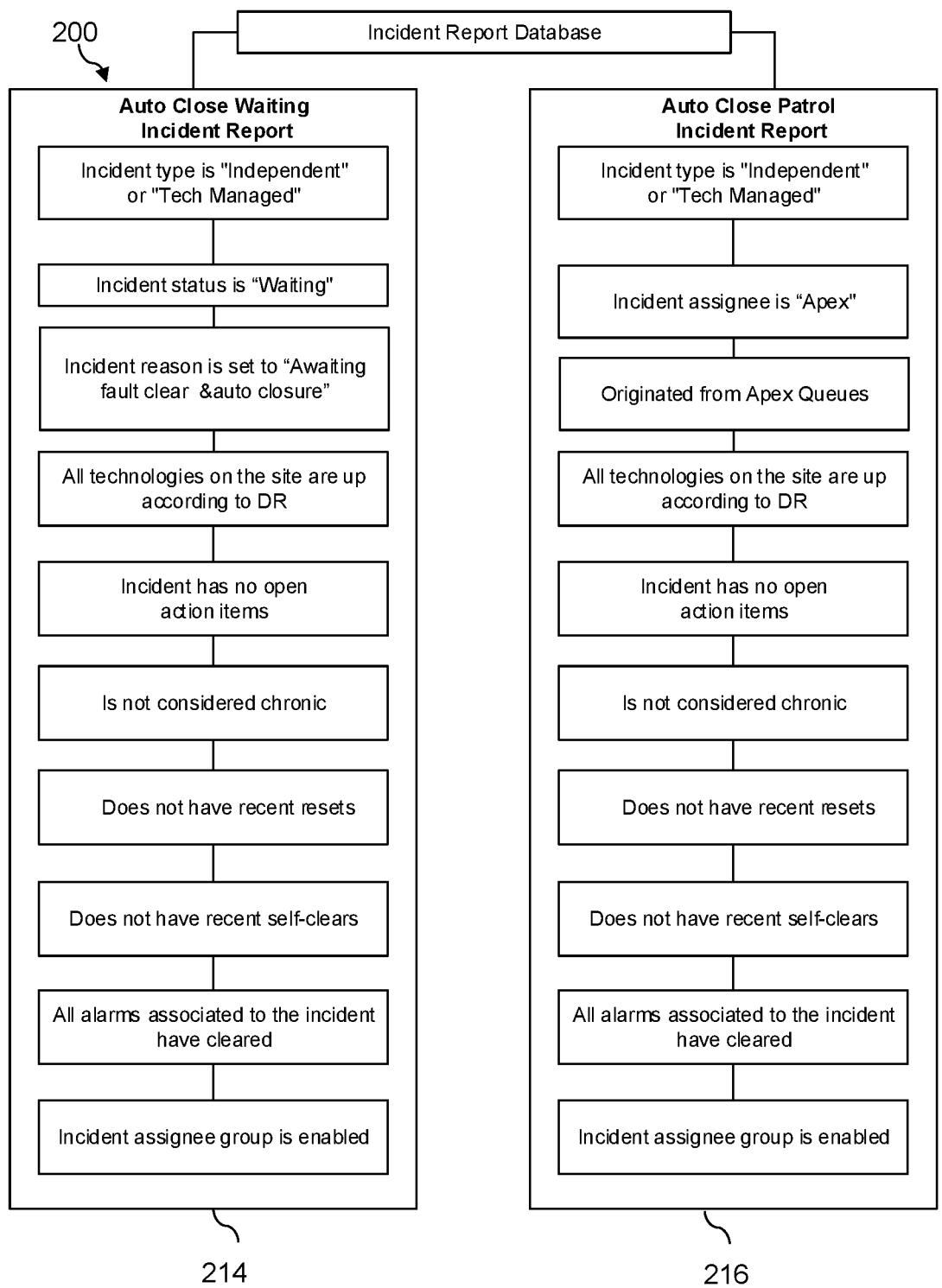

FIGS. 2A-2C are illustrations of checklist contents 200 of an incident report according to an embodiment of the disclosure. The triggered alarms/events may be caused by an event or an issue occurs at a network element in the network. The event may be a large-scale event or a small-scale event. For example, the issue may be a weather issue (such as a storm, hurricane, a tornado, or a freezing rain event), a power outage issue, a transport issue, a cell site issue, an awaiting issue, or a maintenance issue. A large-scale event is determined automatically based on criteria related to proximity of the alarmed cell sites, similarity or identical alarms, and on-set of alarms at about the same time. The triggered alarm may be notified to alarm configuration tool 110 to generate an incident report associated with the incident.

The incident reports may be stored in the incident report database 116 and classified based on the incident. The incident classification tool 115 may classify the incident reports based on an incident type. For example, the incident report is one of auto close assigned incident report 202, auto close storm recovery incident report 204, auto close transferred power incident report 206, auto close maintenance incident report 208, auto close returned power incident report 210, auto close returned transport incident report 212, auto close waiting incident report 214, or auto close patrol incident report 216. The incident report database 114 stores all generated incident reports. Each incident report may comprise status of one or more tasks associated with the incident report before the incident report autocloses. The status of one or more tasks comprising indicators indicating whether the incident is a chronic incident, indicating whether the incident is recent reset incident, and indicating whether the incident is a self-clear incident, and information related to an incident type, an incident status, an incident assignee, status of technologies on a cell site, and status of open action items, status of an incident assignee group, status of alarm associated to the incident, status of the one or more completed tasks and the one or more uncompleted tasks, status of a technology associated with the incident, and/or other information related to alarms.

In one example, the status checklist of the auto close assigned incident report 202 may comprise an incident type as independent or tech managed, an incident status as assigned, incident assignee as a default user, a status of technologies associated with the incident as all technologies on the site are up according to disaster recovery (DR), a status of the one or more completed tasks and the one or more uncompleted tasks as incident has no open action items, a status whether the issue is considered chronic, a status whether the issue has recent resets, a status whether all alarms associated to the incident have cleared, a status whether incident assignee group is enabled, and/or other information related to alarm.

In another example, the checklist of the auto close assigned incident report 204 may comprise an incident type as independent or tech managed, an incident status as assigned or waiting with a reason of awaiting fault clear & auto closure, incident assignee group as a NOC storm recovery team, a status of technologies associated with the incident as all technologies on the site are up according to disaster recovery (DR), a status of the one or more completed tasks and the one or more uncompleted tasks as incident has no open action items, a status whether the issue is considered chronic, and/or a status whether all alarms associated to the incident have cleared, and a status whether incident assignee group is enabled.

Various other examples of checklists of different incidents reports have been disclosed in FIGS. 2A-2C.

Figure 3:
FIG. 3 is an illustration of a NOC dashboard screenshot showing a status checklist of an incident report according to an embodiment of the disclosure.
Figure 3:
Figure 3:
Figure 3:
Figure 3:
Figure 3:

Turning now to FIG. 3, exemplary a NOC dashboard screenshot 300 showing a status checklist of an incident report is provided. The incident reporting tool 116 imports the incident report from the incident report database 114, generates the requirements or checklist for autoclosing the incident report, and displays the status checklist to NOC personnel via the NOC dashboard (or GUI screen) to identify and resolve the requirements for the incident report to be automatically closed. The status checklist list all the tasks or events needed to close a given incident report. Each task listed in the status checklist is provided with a description to drill down to get more details on alarms and to take corrective actions to restore the network to normal operational status. The status checklist comprises a status of the tasks related to one or more of a type of the incident, a status of the incident, a cause of the incident, a status of an incident assignee group, a status of alarm associated to the incident, a status of the one or more completed tasks and the one or more uncompleted tasks, a status of a technology, and/or other information related to alarms. The one or more completed tasks of the status checklist may be marked in the GUI screen by an indicator (e.g., a check mark) indicating the completion of the task and the one or more uncompleted tasks of the status checklist may be marked in the GUI screen by another indicator (e.g., a cross mark) indicating open tasks. For example, as illustrated in FIG. 3, the tasks related to incident type, action items, and incident alarms have been check marked indicating the completion of the tasks, whereas the tasks related to incident reason and disaster recovery have been cross marked indicating open tasks. The NOC personnel, based on these indications in the GUI, identify the open tasks to resolve the incident. Once the NOC personnel resolve the open tasks, the automated alarm handling tool 112 will automatically closing the incident report.

In an embodiment, the incident reporting tool 116 further dynamically or periodically updates the incident report database 114 for all the active incident reports and refreshes the status of all the related tasks/events of each incident report with new status information. For example, the incident reporting tool may check the incident report database every ten seconds, every twenty seconds, or at some other periodic time interval.

Figure 4:
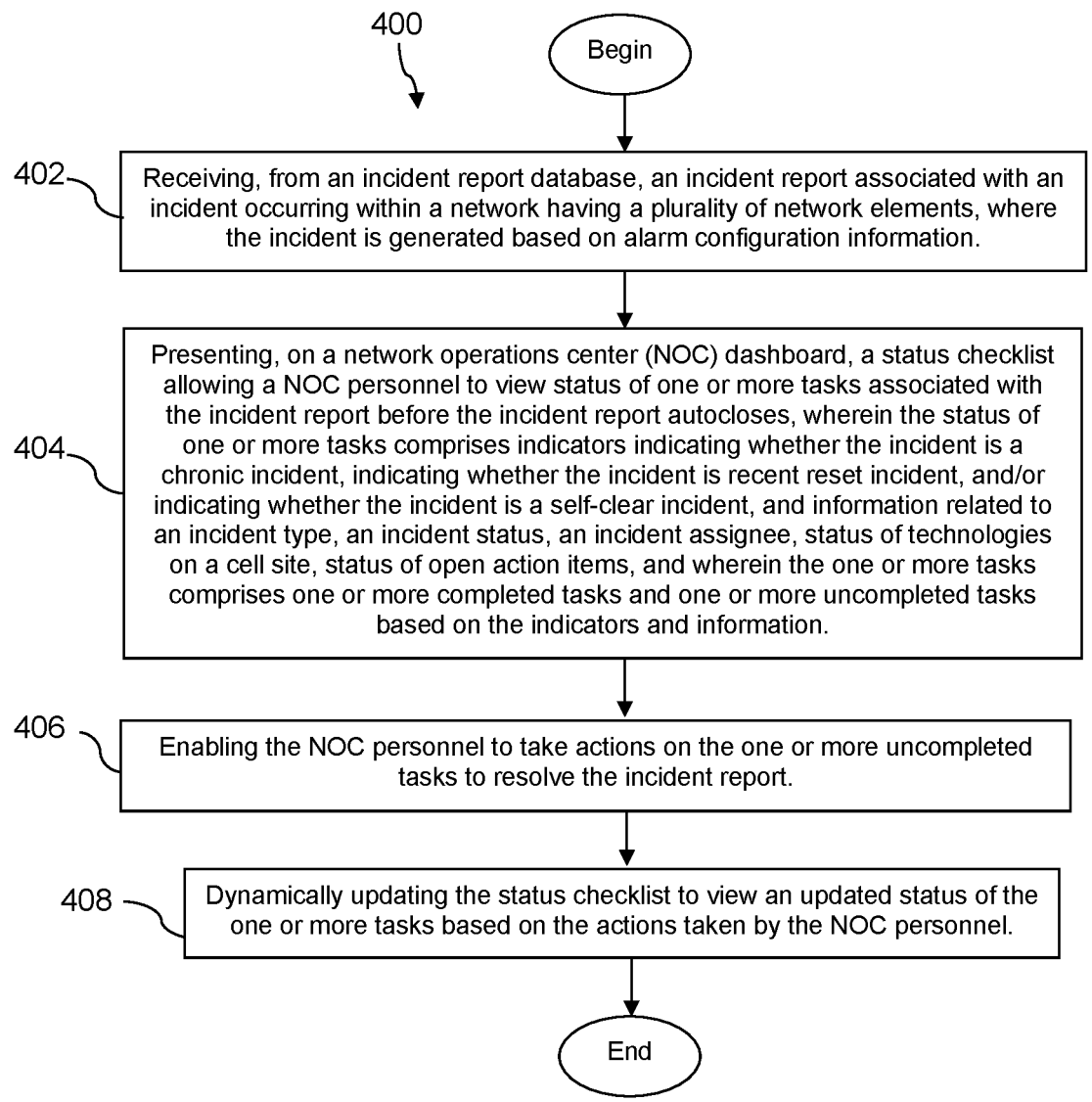
FIG. 4 is a flow chart of a method according to an embodiment of the disclosure.

Turning now to FIG. 4, a method 400 is described. In an embodiment, the method 400 is a method of providing an incident reporting tool for providing insights to NOC personnel on status of incident reports. At block 402, the method 400 comprises receiving, from the incident report database, an incident report associated with an incident occurring within a network having a plurality of network elements, wherein the incident report is generated based on alarm configuration information. At block 404, the method 400 comprises presenting, on a network operations center (NOC) dashboard, a status checklist allowing a NOC personnel to view status of one or more tasks associated with the incident report before the incident report autocloses, wherein the status of one or more tasks comprises indicators indicating whether the incident is a chronic incident, indicating whether the incident is recent reset incident, and/or indicating whether the incident is a self-clear incident, and information related to an incident type, an incident status, an incident assignee, status of technologies on a cell site, status of open action items, and wherein the one or more tasks comprises one or more completed tasks and one or more uncompleted tasks based on the indicators and information. At block 406, the method 400 comprises enabling the NOC personnel to take actions on the one or more uncompleted tasks to resolve the incident report. At block 408, the method 400 comprises dynamically updating the status checklist to view an updated status of the one or more tasks based on the actions taken by the NOC personnel.

Figure 5:
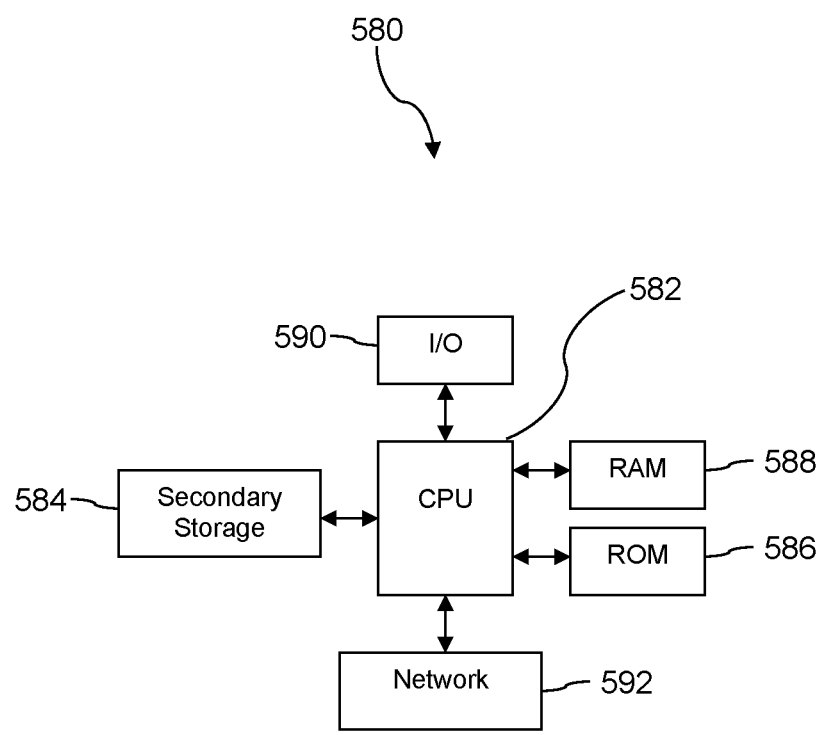
FIG. 5 is a block diagram of a computer system according to an embodiment of the disclosure.

FIG. 5 illustrates a computer system 580 suitable for implementing one or more embodiments disclosed herein. The computer system 580 includes a processor 582 (which may be referred to as a central processor unit or CPU) that is in communication with memory devices including secondary storage 584, read only memory (ROM) 586, random access memory (RAM) 588, input/output (I/O) devices 590, and network connectivity devices 592. The processor 582 may be implemented as one or more CPU chips.

It is understood that by programming and/or loading executable instructions onto the computer system 580, at least one of the CPU 582, the RAM 588, and the ROM 586 are changed, transforming the computer system 580 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 580 is turned on or booted, the CPU 582 may execute a computer program or application. For example, the CPU 582 may execute software or firmware stored in the ROM 586 or stored in the RAM 588. In some cases, on boot and/or when the application is initiated, the CPU 582 may copy the application or portions of the application from the secondary storage 584 to the RAM 588 or to memory space within the CPU 582 itself, and the CPU 582 may then execute instructions that the application is comprised of. In some cases, the CPU 582 may copy the application or portions of the application from memory accessed via the network connectivity devices 592 or via the I/O devices 590 to the RAM 588 or to memory space within the CPU 582, and the CPU 582 may then execute instructions that the application is comprised of. During execution, an application may load instructions into the CPU 582, for example load some of the instructions of the application into a cache of the CPU 582. In some contexts, an application that is executed may be said to configure the CPU 582 to do something, e.g., to configure the CPU 582 to perform the function or functions promoted by the subject application. When the CPU 582 is configured in this way by the application, the CPU 582 becomes a specific purpose computer or a specific purpose machine.

The secondary storage 584 is typically comprised of one or more disk drives or tape drives and is used for non-volatile storage of data and as an over-flow data storage device if RAM 588 is not large enough to hold all working data. Secondary storage 584 may be used to store programs which are loaded into RAM 588 when such programs are selected for execution. The ROM 586 is used to store instructions and perhaps data which are read during program execution. ROM 586 is a non-volatile memory device which typically has a small memory capacity relative to the larger memory capacity of secondary storage 584. The RAM 588 is used to store volatile data and perhaps to store instructions. Access to both ROM 686 and RAM 588 is typically faster than to secondary storage 584. The secondary storage 584, the RAM 588, and/or the ROM 586 may be referred to in some contexts as computer readable storage media and/or non-transitory computer readable media.

I/O devices 590 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 592 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 592 may provide wired communication links and/or wireless communication links (e.g., a first network connectivity device 592 may provide a wired communication link and a second network connectivity device 592 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), Wi-Fi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 592 may enable the processor 582 to communicate with the Internet or one or more intranets. With such a network connection, it is contemplated that the processor 582 might receive information from the network, or might output information to the network in the course of performing the above-described method steps. Such information, which is often represented as a sequence of instructions to be executed using processor 582, may be received from and outputted to the network, for example, in the form of a computer data signal embodied in a carrier wave.

Such information, which may include data or instructions to be executed using processor 582 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 582 executes instructions, codes, computer programs, scripts which it accesses from hard disk, floppy disk, optical disk (these various disk-based systems may all be considered secondary storage 584), flash drive, ROM 586, RAM 588, or the network connectivity devices 592. While only one processor 582 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 584, for example, hard drives, floppy disks, optical disks, and/or other device, the ROM 586, and/or the RAM 588 may be referred to in some contexts as non-transitory instructions and/or non-transitory information.

In an embodiment, the computer system 580 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 680. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and another computer usable program code. The computer program product may be embodied in removable computer storage media and/or non-removable computer storage media. The removable computer readable storage medium may comprise, without limitation, a paper tape, a magnetic tape, magnetic disk, an optical disk, a solid-state memory chip, for example analog magnetic tape, compact disk read only memory (CD-ROM) disks, floppy disks, jump drives, digital cards, multimedia cards, and others. The computer program product may be suitable for loading, by the computer system 580, at least portions of the contents of the computer program product to the secondary storage 584, to the ROM 586, to the RAM 588, and/or to other non-volatile memory and volatile memory of the computer system 580. The processor 582 may process the executable instructions and/or data structures in part by directly accessing the computer program product, for example by reading from a CD-ROM disk inserted into a disk drive peripheral of the computer system 580. Alternatively, the processor 582 may process the executable instructions and/or data structures by remotely accessing the computer program product, for example by downloading the executable instructions and/or data structures from a remote server through the network connectivity devices 592. The computer program product may comprise instructions that promote the loading and/or copying of data, data structures, files, and/or executable instructions to the secondary storage 584, to the ROM 586, to the RAM 588, and/or to other non-volatile memory and volatile memory of the computer system 580.

In some contexts, the secondary storage 584, the ROM 586, and the RAM 588 may be referred to as a non-transitory computer readable medium or a computer readable storage media. A dynamic RAM embodiment of the RAM 588, likewise, may be referred to as a non-transitory computer readable medium in that while the dynamic RAM receives electrical power and is operated in accordance with its design, for example during a period of time during which the computer system 580 is turned on and operational, the dynamic RAM stores information that is written to it. Similarly, the processor 582 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system comprising:
an incident report database comprising records of a plurality of incident reports;
a network operations center (NOC) dashboard configured to present the incident reports; and
an incident reporting tool coupled to the incident report database and the NOC dashboard, and configured to:
receive, from the incident report database, an incident report associated with the incident;
present, on the NOC dashboard, a status checklist allowing a NOC personnel to view status of one or more tasks associated with the incident report before the incident report autocloses, wherein the status of one or more tasks comprises indicators indicating whether the incident is a chronic incident, indicating whether the incident is recent reset incident, and indicating whether the incident is a self-clear incident, and information related to an incident type, an incident status, an incident assignee, status of technologies on a cell site, and status of open action items, and wherein the one or more tasks comprises one or more completed tasks and one or more uncompleted tasks based on the indicators and information;
enable the NOC personnel to take actions on the one or more uncompleted tasks to resolve the incident report; and
update the status checklist to view an updated status of the one or more tasks based on the actions taken by the NOC personnel.

2. The system of claim 1, wherein the incident reporting tool is further configured to periodically monitor the incident report database.

3. The system of claim 1, wherein the incident reporting tool is further configured to periodically update the incident report to update the status checklist, and wherein the status checklist is updated every 20 seconds with the updated status.

4. The system of claim 1, wherein the incident report is one of an auto close assigned incident report, an auto close storm recovery incident report, an auto close transferred power incident report, an auto close maintenance incident report, an auto close returned power incident report, an auto close returned transport incident report, an auto close waiting incident report, or an auto close patrol incident report.

5. The system of claim 1, wherein the one or more tasks further comprises information about one or more of a cause of the incident, a status of an incident assignee group, a status of alarm associated to the incident, a status of the one or more completed tasks and the one or more uncompleted tasks, and a status of a technology associated with the incident.

6. The system of claim of 1, wherein the NOC dashboard is a graphical user interface employed by the NOC personnel to view the incident report.

7. The system of claim of 1, wherein the incident is a large-scale event (LSE).

8. A method implemented by an incident reporting tool, comprising:
receiving, from an incident report database, an incident report associated with an incident occurring within a network having a plurality of network elements, wherein the incident report is generated based on alarm configuration information;
presenting, on a network operations center (NOC) dashboard, a status checklist allowing a NOC personnel to view status of one or more tasks associated with the incident report before the incident report autocloses, wherein the status of one or more tasks comprises indicators indicating whether the incident is a chronic incident, indicating whether the incident is recent reset incident, and/or indicating whether the incident is a self-clear incident, and information related to an incident type, an incident status, an incident assignee, status of technologies on a cell site, status of open action items, and wherein the one or more tasks comprises one or more completed tasks and one or more uncompleted tasks based on the indicators and information;
enabling the NOC personnel to take actions on the one or more uncompleted tasks to resolve the incident report; and
dynamically updating the status checklist to view an updated status of the one or more tasks based on the actions taken by the NOC personnel.

9. The method of claim 8, further comprising periodically monitoring the incident report database.

10. The method of claim 8, further comprising periodically updating the incident report to update the status checklist, wherein the status checklist is updated every 20 seconds with the updated status.

11. The method of claim 8, wherein the incident report is one of an auto close assigned incident report, an auto close storm recovery incident report, an auto close transferred power incident report, an auto close maintenance incident report, an auto close returned power incident report, an auto close returned transport incident report, an auto close waiting incident report, or an auto close patrol incident report.

12. The method of claim 8, wherein the one or more tasks further comprises information about one or more of a cause of the incident, a status of an incident assignee group, a status of alarm associated to the incident, a status of the one or more completed tasks and the one or more uncompleted tasks, and a status of a technology associated with the incident.

13. The method of claim 8, wherein the NOC dashboard is a graphical user interface employed by the NOC personnel to view the incident report.

14. A non-transitory computer-readable media of an incident reporting tool storing computer-executable instructions that upon execution cause one or more processors to perform acts comprising:
receiving, from an incident report database, an incident report associated with an incident occurring within a network having a plurality of network elements, wherein the incident report is generated based on alarm configuration information;

presenting, on the NOC dashboard, a status checklist allowing a NOC personnel to view status of one or more tasks associated with the incident report before the incident report autocloses, wherein the status of one or more tasks comprises indicators indicating whether the incident is a chronic incident, indicating whether the incident is recent reset incident, and/or indicating whether the incident is a self-clear incident, and information related to an incident type, an incident status, an incident assignee, status of technologies on a cell site, status of open action items, and wherein the one or more tasks comprises one or more completed tasks and one or more uncompleted tasks based on the indicators and information;

enabling the NOC personnel to take actions on the one or more uncompleted tasks to resolve the incident report; and dynamically updating the status checklist to view an updated status of the one or more tasks based on the actions taken by the NOC personnel.

15. The non-transitory computer-readable media of claim 14, wherein the incident report is one of an auto close assigned incident report, an auto close storm recovery incident report, an auto close transferred power incident report, an auto close maintenance incident report, an auto close returned power incident report, an auto close returned transport incident report, an auto close waiting incident report, or an auto close patrol incident report.

16. The non-transitory computer-readable media of claim 14, wherein the one or more tasks further comprises information about one or more of a cause of the incident, a status of an incident assignee group, a status of alarm associated to the incident, a status of the one or more completed tasks and the one or more uncompleted tasks, and a status of a technology associated with the incident.

17. The non-transitory computer-readable media of claim 14, wherein the NOC dashboard is a graphical user interface employed by the NOC personnel to view the incident report.

18. The non-transitory computer-readable media of claim 14, wherein the network elements include routers, digital switches, media gateways, mobile switching centers (MSCs), visitor location registers (VLRs), a mobile management entity (MME), a serving gateway (SGW), a packet data network gateway (PDN-GW), a radius server, an authentication-authorization-and-accounting (AAA) server, a base transceiver station (BTS), short message service (SMS) messaging components, core network components, wireless radio access network components, or voicemail components.

19. The non-transitory computer-readable media of claim 14, wherein the computer-executable instructions that upon execution further cause one or more processors to perform acts comprising periodically monitoring the incident report database.

20. The non-transitory computer-readable media of claim 14, wherein the computer-executable instructions that upon execution further cause one or more processors to perform acts comprising periodically updating the incident report to update the status checklist.

* * * * *